United States Patent
Nakata et al.

(10) Patent No.: US 11,295,779 B2
(45) Date of Patent: Apr. 5, 2022

(54) OPTICAL DISK DEVICE

(71) Applicant: Panasonic Intellectual Property Management Co., Ltd., Osaka (JP)

(72) Inventors: Kohei Nakata, Nara (JP); Yasushi Kobayashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/281,686

(22) PCT Filed: Nov. 8, 2019

(86) PCT No.: PCT/JP2019/044014
§ 371 (c)(1),
(2) Date: Mar. 31, 2021

(87) PCT Pub. No.: WO2020/100777
PCT Pub. Date: May 22, 2020

(65) Prior Publication Data
US 2022/0020394 A1 Jan. 20, 2022

(30) Foreign Application Priority Data
Nov. 15, 2018 (JP) .............................. JP2018-214767

(51) Int. Cl.
*G11B 7/0045* (2006.01)
*G11B 20/10* (2006.01)
(Continued)

(52) U.S. Cl.
CPC .... *G11B 20/10509* (2013.01); *G11B 7/00456* (2013.01); *G11B 20/10268* (2013.01);
(Continued)

(58) Field of Classification Search
None
See application file for complete search history.

(56) References Cited

U.S. PATENT DOCUMENTS

| | | | | |
|---|---|---|---|---|
| 5,311,178 A | * | 5/1994 | Pan | G11B 20/10009 341/59 |
| 6,721,255 B1 | * | 4/2004 | Gushima | G11B 7/0062 369/124.04 |

(Continued)

FOREIGN PATENT DOCUMENTS

| | | |
|---|---|---|
| JP | 10-261272 | 9/1998 |
| JP | 2003-141823 | 5/2003 |

(Continued)

OTHER PUBLICATIONS

International Search Report dated Jan. 28, 2020 in International (PCT) Application No. PCT/JP2019/044014 with English translation.

(Continued)

*Primary Examiner* — Peter Vincent Agustin
(74) *Attorney, Agent, or Firm* — Wenderoth, Lind & Ponack, L.L.P.

(57) ABSTRACT

The present disclosure provides an optical disk device capable of reproducing data recorded on a high linear density optical disk stably. The optical disk device according to the disclosure is characterized by being equipped with a recording expected waveform generation circuit which generates, at the time of recording, an expected waveform that is expected to be obtained at the time of decoding; and a recording pulse generation circuit which generates a recording pulse for driving a laser with power and a time width suitable for an amplitude value of the recording expected waveform for each sampling point of the recording expected waveform.

6 Claims, 11 Drawing Sheets

(51) Int. Cl.
*G11B 20/12* (2006.01)
*G11B 20/18* (2006.01)

(52) U.S. Cl.
CPC .......... *G11B 20/1217* (2013.01); *G11B 20/18* (2013.01); *G11B 2020/1292* (2013.01)

(56) References Cited

U.S. PATENT DOCUMENTS

| | | | |
|---|---|---|---|
| 9,754,619 B1* | 9/2017 | Nakata | G11B 7/005 |
| 2002/0018419 A1* | 2/2002 | Watabe | G11B 7/126 |
| | | | 369/53.26 |
| 2003/0053234 A1* | 3/2003 | Patapoutian | G11B 20/10009 |
| | | | 360/29 |
| 2003/0067998 A1 | 4/2003 | Nakajima et al. | |
| 2003/0198169 A1* | 10/2003 | Fujiwara | G11B 20/10212 |
| | | | 369/59.22 |
| 2004/0076245 A1* | 4/2004 | Okamoto | G11B 20/10222 |
| | | | 375/341 |
| 2004/0213340 A1* | 10/2004 | Kuribayashi | G11B 20/10009 |
| | | | 375/232 |
| 2005/0117504 A1* | 6/2005 | Ogawa | G11B 7/005 |
| | | | 369/124.12 |
| 2006/0187812 A1* | 8/2006 | Ando | G11B 7/24082 |
| | | | 369/275.3 |
| 2006/0291356 A1* | 12/2006 | Ando | G11B 7/00736 |
| | | | 369/53.11 |
| 2007/0115785 A1* | 5/2007 | Shihara | G11B 20/10009 |
| | | | 369/59.22 |
| 2007/0234188 A1* | 10/2007 | Shiraishi | G11B 20/10296 |
| | | | 714/794 |
| 2010/0014405 A1 | 1/2010 | Nakajima et al. | |
| 2010/0039912 A1 | 2/2010 | Nakano et al. | |
| 2010/0309773 A1 | 12/2010 | Kobayashi et al. | |
| 2014/0341006 A1* | 11/2014 | Miyashita | G11B 20/12 |
| | | | 369/30.18 |
| 2016/0275981 A1 | 9/2016 | Kobayashi et al. | |
| 2016/0284380 A1* | 9/2016 | Nakata | G11B 20/10009 |
| 2017/0103780 A1* | 4/2017 | Nakata | G11B 7/00718 |
| 2017/0194027 A1* | 7/2017 | Miyashita | G11B 7/005 |

FOREIGN PATENT DOCUMENTS

| | | |
|---|---|---|
| WO | 2008/032700 | 3/2008 |
| WO | 2010/038397 | 4/2010 |
| WO | 2015/107572 | 7/2015 |

OTHER PUBLICATIONS

Written Opinion of the International Searching Authority dated Jan. 28, 2020 in International (PCT) Application No. PCT/JP2019/044014.

* cited by examiner

OPTICAL DISK DEVICE

TECHNICAL FIELD

The present invention relates to an optical disk device for recording and reproducing data on and from an optical disk and an optical disk on which data are recorded optically.

BACKGROUND ART

At present, many kinds of optical disks such as DVD and Blu-ray (registered trademark) disk (hereinafter abbreviated as "BD") are used as information recording media for storing videos, data, etc. Among techniques for increasing the recording capacity per volume without raising the cost of an optical disk from the viewpoint of space efficiency of data storage are a technique of increasing the track density and a technique of increasing the linear density.

The partial response most likelihood (hereinafter abbreviated as "PRML") signal processing technique is used broadly as a technique for increasing the linear density. A binary signal that is expressed by marks and spaces is recorded on tracks of an optical disk. When such a binary signal is reproduced, a detected reproduction signal is bandwidth-restricted to a low-frequency range because of the frequency characteristic of detection using a light beam. This phenomenon, which is called intersymbol interference, occurs because plural marks and spaces are read out at the same time depending on a diffraction limit size of a light beam. The PRML signal processing technique is one of maximum likelihood decoding techniques which estimate a recorded binary signal by performing comparison and selection on an expected waveform and a reproduction signal waveform on the assumption of presence of intersymbol interference. PRML signal processing techniques in which the intersymbol interference width is extended have come to be employed with increase in linear density. On the other hand, recording of a binary signal in the form of marks and spaces is performed by emitting an intense light beam in a time width corresponding to each mark so that the mark can be recorded. To perform reproduction satisfactorily according to the PRML signal processing technique, the light emission time width and the delay position are adjusted for each mark.

Among techniques for increasing the linear density, a multi-value recording method is known in which cells are provided virtually at constant intervals in a track extension direction (line direction) and a recording mark having one of three or more different sizes is recorded in each cell. Extension from a binary signal (described above) to a multi-value signal (three or more values) makes it possible to increase the linear density. The above-described PRML signal processing technique can also be used for reproducing an original multi-value signal from multi-value-recorded tracks.

CITATION LIST

Patent Literature

Patent document 1: JP-A-2003-141823
Patent document 2: JP-A-H10-261272

SUMMARY OF INVENTION

Object of Disclosure

An object of the present disclosure is to provide an optical disk device capable of reproducing data recorded on a high linear density optical disk stably.

Solution to Problem

The optical disk device according to the disclosure is an optical disk device for recording and reproducing recording data on and from a track of an optical disk, including: a modulation circuit configured to generate, from the recording data, a modulated signal that is coded under a prescribed coding method; a recording expected waveform generation circuit configured to generate a recording expected waveform that is expected to be obtained in decoding the recording data from the track on which the modulated signal is recorded under a condition that a channel base length of the modulated signal is equal to L; a recording pulse generation circuit configured to generate a recording pulse for driving the laser with power and a time width corresponding to an amplitude value of the recording expected waveform for each sampling point of the recording expected waveform; and an optical pickup having a laser of a wavelength $\lambda$ and an objective lens having a numerical aperture N and configured to record the recording data by applying laser pulses to the track based on the recording pulse.

The recording expected waveform generation circuit may generate a first expected waveform that is sampled at the channel base length L and expected to be obtained when the recording data are decoded from the track on which the modulated signal is recorded, and generate a second expected waveform by resampling the first expected waveform at an interval within such a range as to be longer than or equal to the channel base length L and shorter than or equal to ½ of a diffraction limit length ($=\lambda/4N$) and output the second expected waveform as the recording expected waveform.

The optical disk device is further characterized in that the optical pick up further detects a reproduction signal from the track, and the optical disk device further includes: a reproduction signal decoding circuit configured to maximum-likelihood-decode, from the reproduction signal, the modulated signal recorded on the track using a condition of a frequency characteristic corresponding to the recording expected waveform; and a demodulation circuit configured to demodulate the recorded data under the prescribed coding method from the modulated signal decoded by the reproduction signal decoding circuit.

The reproduction signal decoding circuit may decode the reproduction signal using the first expected waveform as an expected waveform of the maximum likelihood decoding.

The optical disk device may further include a recording condition evaluation circuit configured to correct a relationship between the power and the time width for the amplitude value of the recording expected waveform in the recording pulse generation circuit based on an error between the recording expected waveform and the reproduction signal.

The optical disk device may further include a reproduction signal memory circuit configured to store, as digital waveform data, the reproduction signal detected by the optical pickup from the track on which the recording data is recorded, before the recording of the recording data; and a noise waveform addition circuit configured to read out the digital waveform data corresponding to a recording position of the recording data, in which the recording expected waveform generation circuit is configured to generate, as the recording expected waveform, a waveform obtained by subtracting the digital waveform data from a waveform that is expected to be obtained when the recording data is decoded from the track on which the modulated signal is recorded.

Advantageous Effects of Disclosure

The optical disk device according to the disclosure makes it possible to reproduce data recorded on a high linear density optical disk stably.

DESCRIPTION OF EMBODIMENTS

Embodiments will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. This is to prevent the following description from becoming unnecessarily redundant and thereby facilitate understanding of those skilled in the art.

The following description and the accompanying drawings are provided to allow those skilled in the art to understand the disclosure thoroughly and are not intended to restrict the subject matter set forth in the claims.

Embodiment 1

1. Configuration

Figure 1:
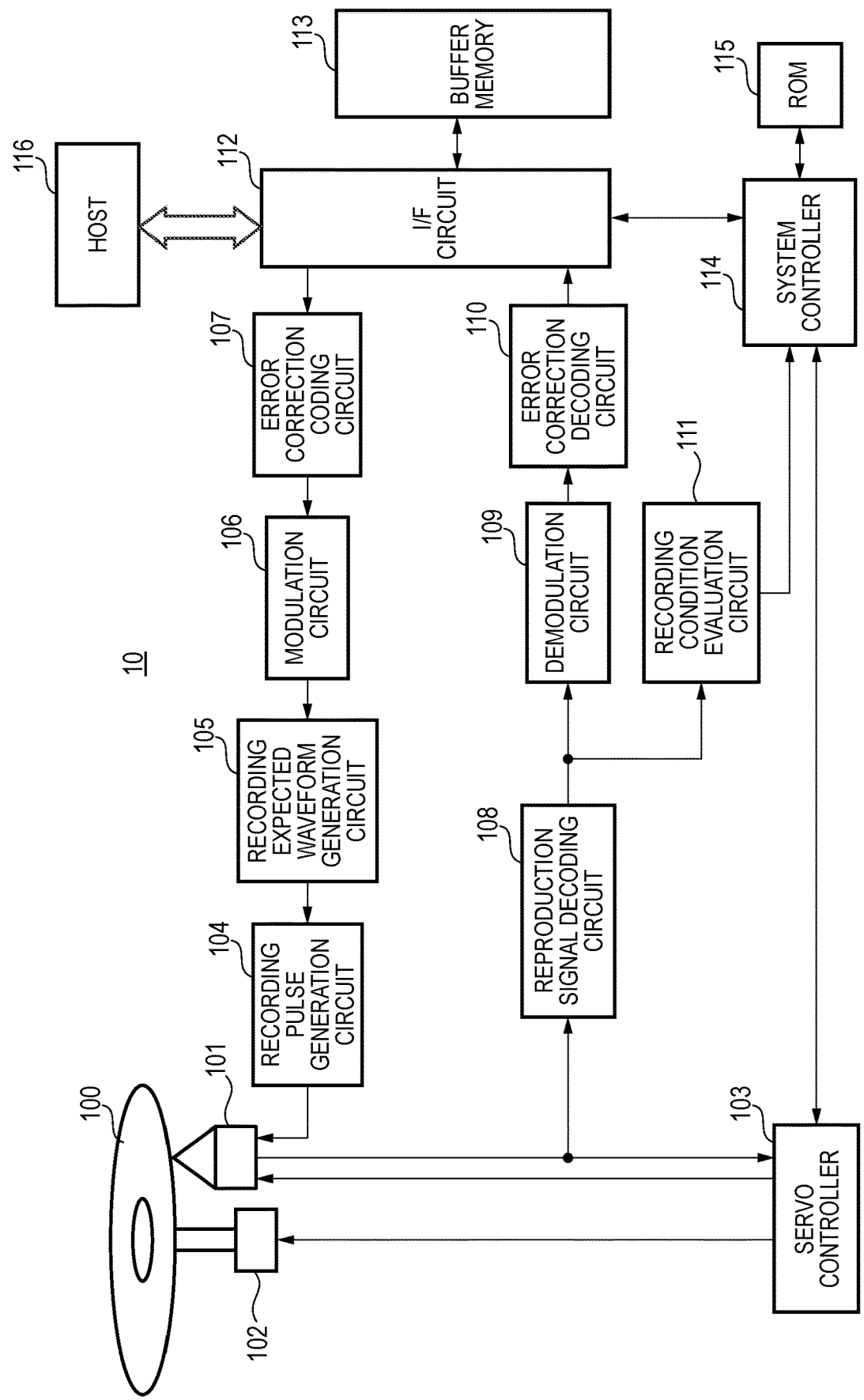
FIG. 1 is a block diagram showing the configuration of an optical disk device according to a first embodiment.

FIG. 1 is a diagram showing the configuration of an optical disk device 10 according to a first embodiment. As shown in FIG. 1, the optical disk device 10 includes an optical head 101, a spindle motor 102, a servo controller 103, a recording pulse generation circuit 104, a recording expected waveform generation circuit 105, a modulation circuit 106, an error correction coding circuit 107, a reproduction signal decoding circuit 108, a demodulation circuit 109, an error correction decoding circuit 110, a recording condition evaluation circuit 111, an I/F circuit 112, a buffer memory 113, a system controller 114, and a ROM (read-only memory) 115.

The optical disk device 10 records and reproduces user data (an example of the term "recording data") on and from an optical disk 100. Tracks are formed on the optical disk 100 spirally from inside to outside. The tracks are configured by groove tracks that are formed by grooves and land tracks each of which is formed between adjacent groove tracks. User data can be recorded in both of the groove tracks and the land tracks.

The spindle motor 102 rotates the optical disk 100. The optical head 101 applies a light beam to the optical disk 100 to record user data on and reproduce user data from the optical disk 100.

By controlling the optical head 101 and the spindle motor 102, the servo controller 103 performs a control for scanning tracks on the optical disk 100 with a light beam emitted from the optical head 101 while focusing the light beam on the tracks and a movement control for accessing a target track. The servo controller 103 controls the position of the optical head 101 and the rotation speed of the spindle motor 102 so that the optical head 101 scans the optical disk 100 at a prescribed linear velocity.

The I/F circuit 112 receives user data to be recorded on the optical disk 100 from the host 116 and stores the received user data in the buffer memory 113. The I/F circuit 112 sends user data stored in the buffer memory 113 after being reproduced from the optical disk 100 to the host 116. Furthermore, the I/F circuit 112 sends user data etc. stored in the buffer memory 113 to another internal block and, conversely, stores user data etc. received from another internal block in the buffer memory 113.

The error correction coding circuit 107 generates coded data by adding parity codes for error correction to user data received from the I/F circuit 112.

The modulation circuit 106 receives the coded data from the error correction coding circuit 107 and generates a modulated signal that is modulated according to prescribed modulation codes.

The recording expected waveform generation circuit 105 generates, from the modulated signal, at the time of recording, a waveform (recording expected waveform) of a reproduction signal that is expected to be obtained when reproduction is performed on tracks on which the user data are recorded.

The recording pulse generation circuit 104 converts the recording expected waveform generated by the recording-expected waveform generation circuit 105 into a recording pulse signal and drives the optical head 101 so that it emits a light beam. Marks are formed on the optical disk 100 by heat of the light beam applied to it.

On the other hand, user data recorded on the optical disk 100 are reproduced by the reproduction signal decoding circuit 108, the demodulation circuit 109, and the error correction decoding circuit 110.

The optical head 101 constitutes an optical pickup which includes a laser that emits a light beam having a wavelength $\lambda$ and an objective lens having a numerical aperture N. The optical head 101 applies a light beam to the optical disk 100 and detects reflection light coming from the optical disk 100.

The optical head 101 outputs a reproduction signal on the basis of the detected reflection light.

The reproduction signal decoding circuit 108 generates a decoding signal by decoding the reproduction signal. More specifically, the reproduction signal decoding circuit 108 compares the reproduction signal with expected value waveforms, selects an expected value waveform closest to the reproduction signal, and performs PRML signal processing (an example of the term "maximum likelihood decoding") for outputting, as a decoding signal, a pattern signal on the basis of which the selected expected value waveform was obtained. The expected value waveforms are given characteristics that are determined taking into consideration influence of bandwidth limitation due to a frequency characteristic of detection using a light beam.

The demodulation circuit 109 demodulates the decoding signal into coded data according to the prescribed modulation codes.

The error correction decoding circuit 110 restores the user data by correcting errors in the demodulated coded data.

The ROM 115 is a flash memory. The ROM 115 is stored with programs that allow the system controller 114 to control the entire optical disk device 10.

The system controller 114 controls the individual circuits and controls a communication with the host 116 by reading out and running the programs stored in the ROM 115. For the sake of convenience, arrows to indicate controls that are performed by the system controller 114 on the respective circuits are omitted in FIG. 1. The system controller 114 of the optical disk device 10 according to this embodiment controls operations of the respective circuits that relate to recording and reproduction of user data.

2. Operation

Next, a description will be made of how the optical disk device 10 according to this embodiment operates.

First, a description will be made of an operation of recording on tracks in a data zone of the optical disk 100 in the optical disk device 10 according to this embodiment.

The I/F circuit 112 acquires user data and recording destination logical addresses that are sent from the host 116. The user data are divided into data blocks having a prescribed unit size and sent to the error correction coding circuit 107 data block by data block.

The error correction coding circuit 107 converts the user data into coded data by adding parity codes for correction of errors that may occur at the time of reproduction to the user data, data block by data block.

The modulation circuit 106 modulates the parity-codes-added coded data into a modulated signal according to the prescribed modulation codes.

Figure 2:
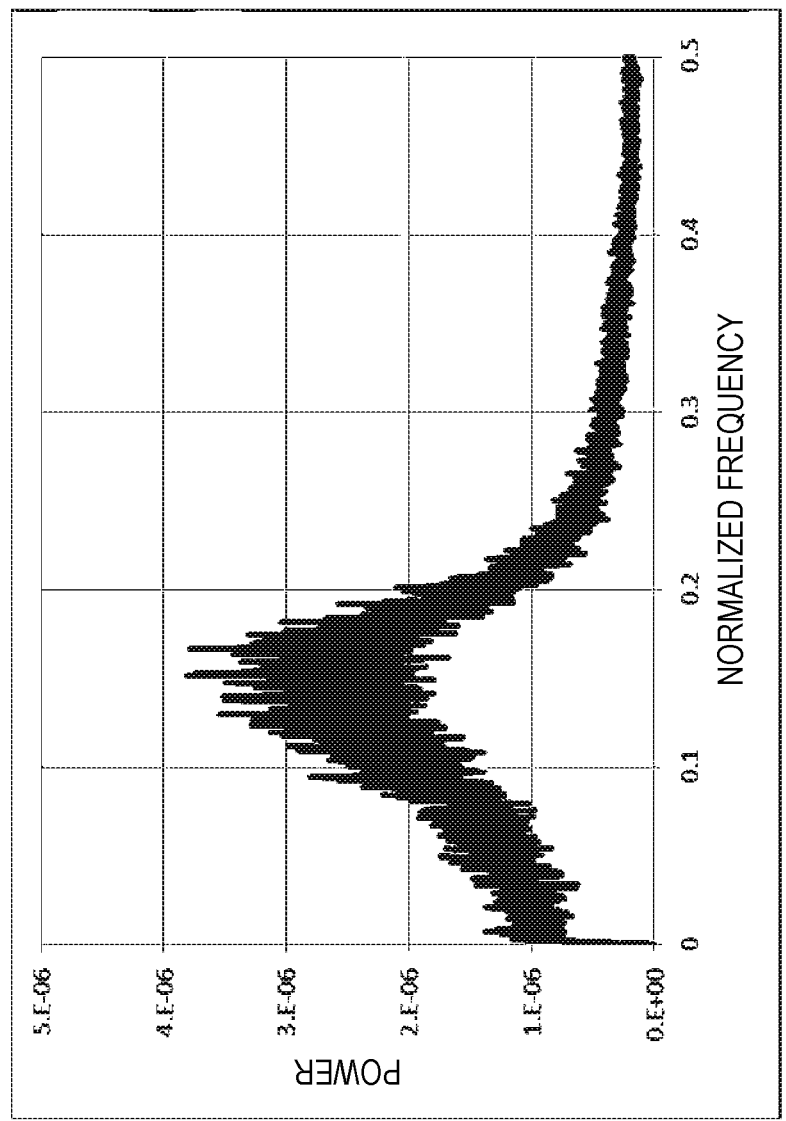
FIG. 2 is a graph showing a power spectrum characteristic of an RLL modulation codes of d=1.

FIG. 2 shows a power spectrum of a modulated signal modulated using RLL modulation codes of d=1 limitation which is employed in the BD etc. The term "d=1 limitation" means that the length of a shortest mark or space corresponds to two channel bits (one channel bit will be hereinafter referred to as "1T"). Thus, a pattern in which shortest 2T marks and shortest 2T spaces occur continuously is a highest frequency pattern and has a normalized frequency 0.25. It is seen from FIG. 2 that the frequency of patterns in a normalized frequency range 0.1 to 0.2 is high with the RLL modulation codes of d=1 limitation.

Figure 3:
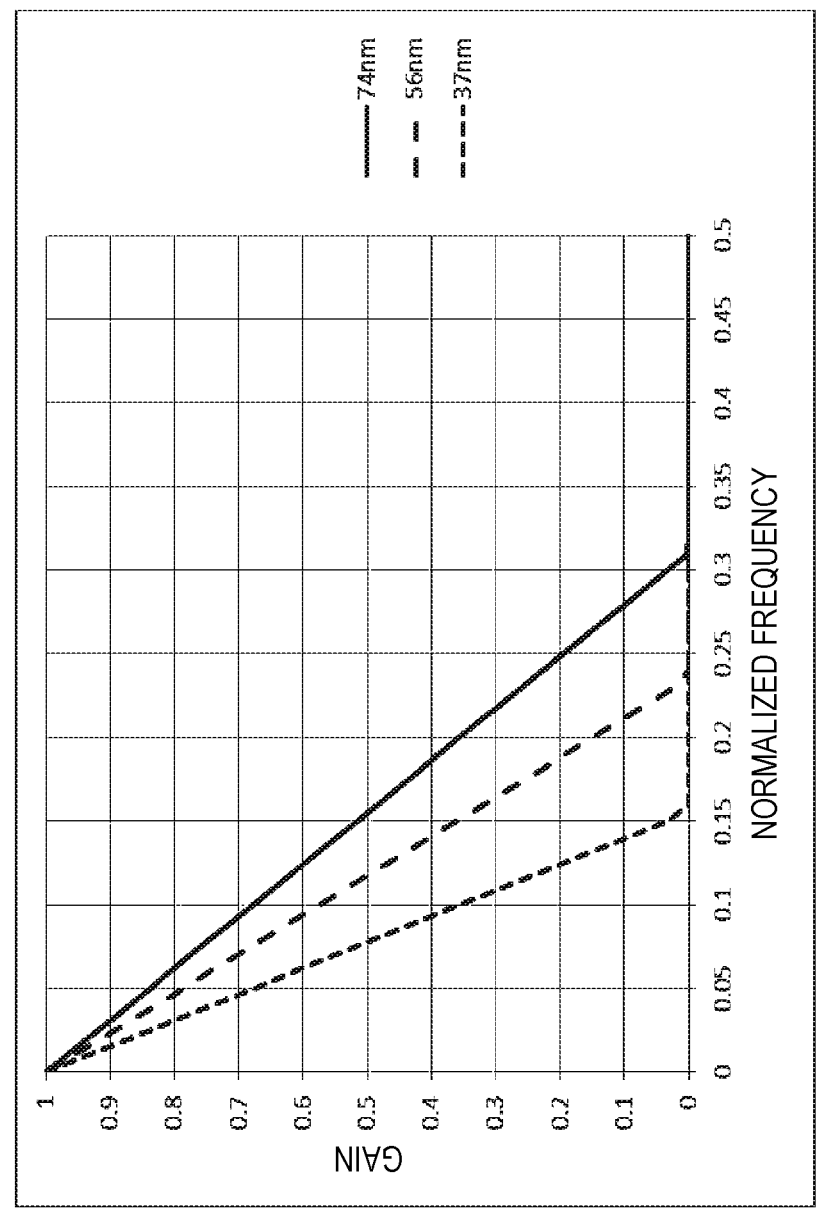
FIG. 3 is a graph showing a frequency characteristic of detection using a light beam.

FIG. 3 shows, in a simplified manner, how the lowpass characteristic of detection using a light beam at the time of reproduction varies when the channel base length, that is, the 1T length, is decreased from 74 nm to 56 nm and to 37 nm and the recording linear density is increased accordingly in a case that the numerical aperture N of the objective lens of the optical head 101 is 0.85 and the wavelength λ of a light beam is 405 nm. The diffraction limit is calculated as λ/(2×N)=238.2 nm from a relation of the NA and λ and the gain becomes zero at a normalized frequency corresponding to this length. Where the 1T length is equal to 74 nm, detection is possible in a frequency range to a normalized frequency 0.3 but the detectable frequency range narrows as the linear density increases.

In the case of the RLL modulation codes of d=1 limitation shown in FIG. 2, most of the power spectrum is in a normalized frequency range 0.1 to 0.2. In the case of the linear density corresponding to the 1T length 74 nm (see FIG. 3), the lowpass characteristic covers the frequency range of the power spectrum of the RLL modulation codes of d=1 limitation sufficiently. In the case of the linear density corresponding to the 1T length 56 nm, a detectable frequency range of the optical head 101 is lower than or equal to 0.25: it can be said that the lowpass characteristic narrowly covers the frequency range of the power spectrum of the RLL modulation codes of d=1 limitation. Where the linear density is increased to such a level as to correspond to the 1T length 37 nm, components in a frequency range that is higher than or equal to a normalized frequency 0.15 cannot be detected: the lowpass characteristic covers only about half of the power spectrum of the RLL modulation codes of d=1 limitation.

The recording expected waveform generation circuit 105 and the recording pulse generation circuit 104 form marks on the optical disk 100 so that a reproduction signal that is close to a recording expected waveform can be obtained in reproduction. Conventionally, a binary modulated signal itself generated using RLL modulation codes is recorded in the form of marks and spaces. First, conventional recording and reproduction will be described with reference to FIGS. 4 to 7.

Figure 4:
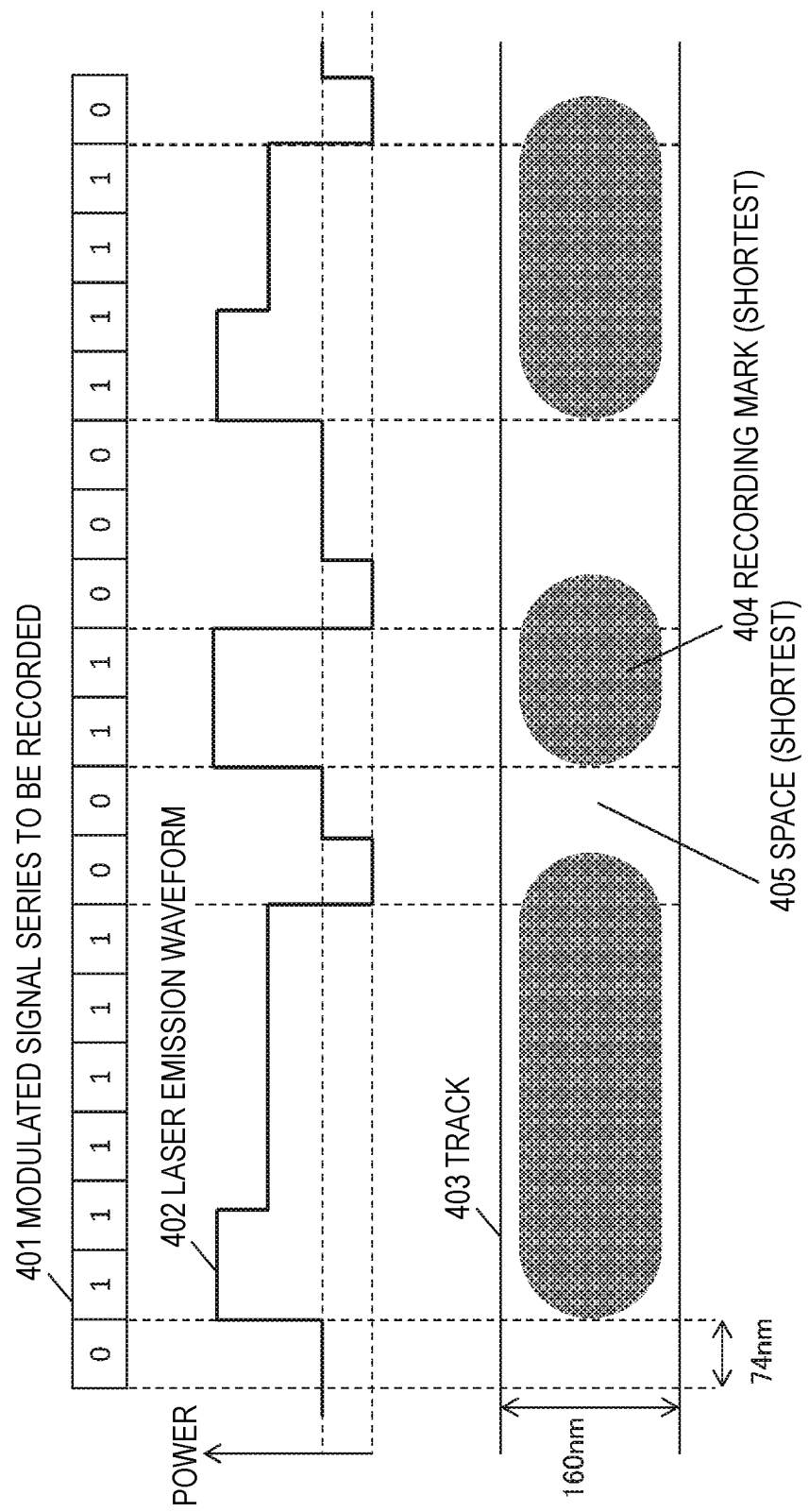
FIG. 4 is a diagram showing a state that marks and spaces are recorded at a low linear density.

FIG. 4 shows a state that a binary modulated signal itself is recorded in the form of marks and spaces at a linear density corresponding to the 1T length 74 nm. A modulated signal series 401 to be recorded is a binary modulated signal. To record marks in intervals in which the modulated signal series 401 has a value "1," the laser is caused to emit light in corresponding intervals with power values and time widths of a laser emission waveform 402. To control a start shape and an end shape of each mark, the power is increased at a start position and decreased at an end position. Recording marks 404 are formed on tracks 403 by the laser emission waveform 402. The shortest length (2T length) of the RLL modulation codes of d=1 limitation is 148 nm which is approximately equal to a track width 160 nm. Thus, as shown in FIG. 4, long marks and short marks are both formed so as to have widths that are approximately equal to the track width.

Figure 5:
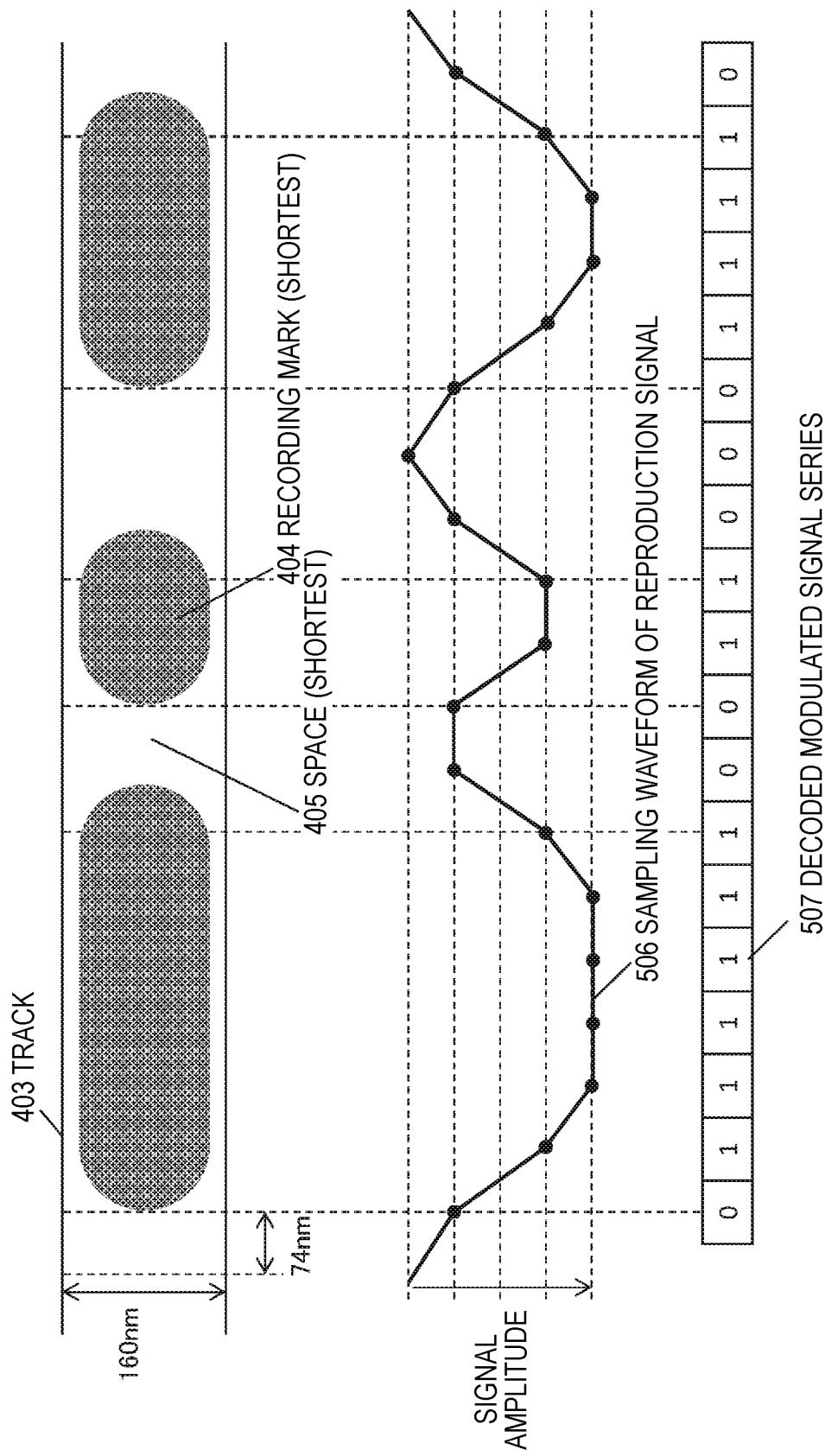
FIG. 5 is a diagram showing a reproduction signal obtained by detecting the state that the marks and the spaces are recorded at the low linear density.

FIG. 5 shows a reproduction signal that is obtained when the recording state shown in FIG. 4 is subjected to reproduction. Since the 1T length is as long as 74 nm and the linear density is low, long marks and short marks are both formed so as to have widths that are approximately the same. As a result, a binary state can be defined in such a manner that portions of recording marks 404 have a value "1" and portions of spaces 405 have a value "0" and a sampling waveform 506 of a reproduction signal is obtained as a result of bandwidth limitation on this binary state by the frequency characteristic of detection using a light beam. The reproduction signal decoding circuit 108 can decode the sampling waveform 506 of the reproduction signal into the recorded modulated signal series easily by the PRML signal processing technique and obtain a decoded modulated signal series 507.

Figure 6:
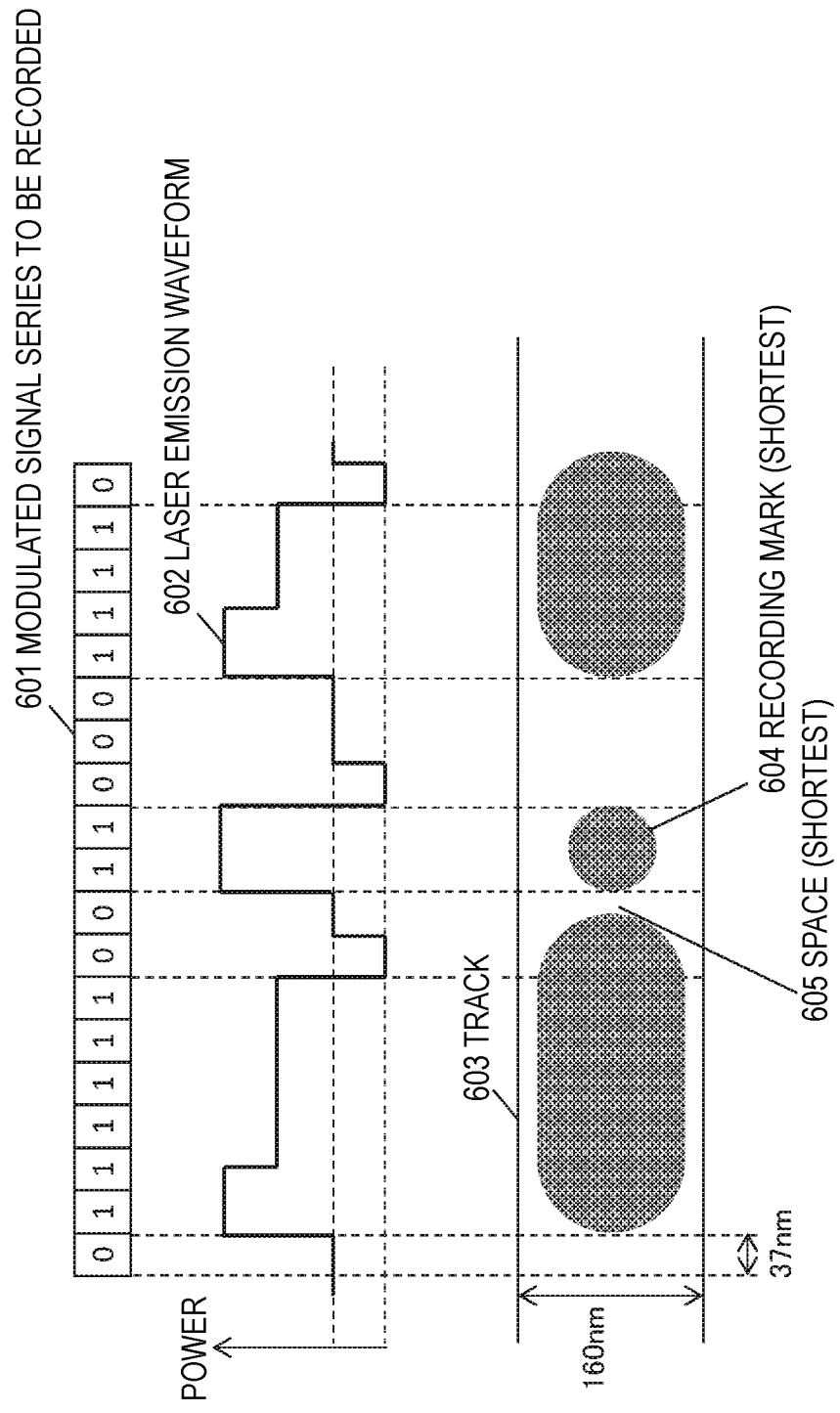
FIG. 6 is a diagram showing a state that marks and spaces are recorded at a high linear density.

On the other hand, FIG. 6 shows a state that the linear density is doubled by decreasing the 1T length to 37 nm. To record marks in intervals in which a binary modulated signal series 601 has a value "1," the laser is caused to emit light in corresponding intervals with power values and time widths of a laser emission waveform 602 by the same method as shown in FIG. 4. However, whereas the track width of tracks 603 is 160 nm, the shortest length (2T length) of RLL modulation codes of d=1 limitation is 74 nm which is approximately half of the track width. Thus, as in recording marks 604 and spaces 605 shown in FIG. 6, the widths of short recording marks are decreased and the length of each short space becomes extremely short being interposed between adjacent recording marks. When the linear density is made so high, a recording state becomes such that long marks and short marks have large differences in width.

Figure 7:
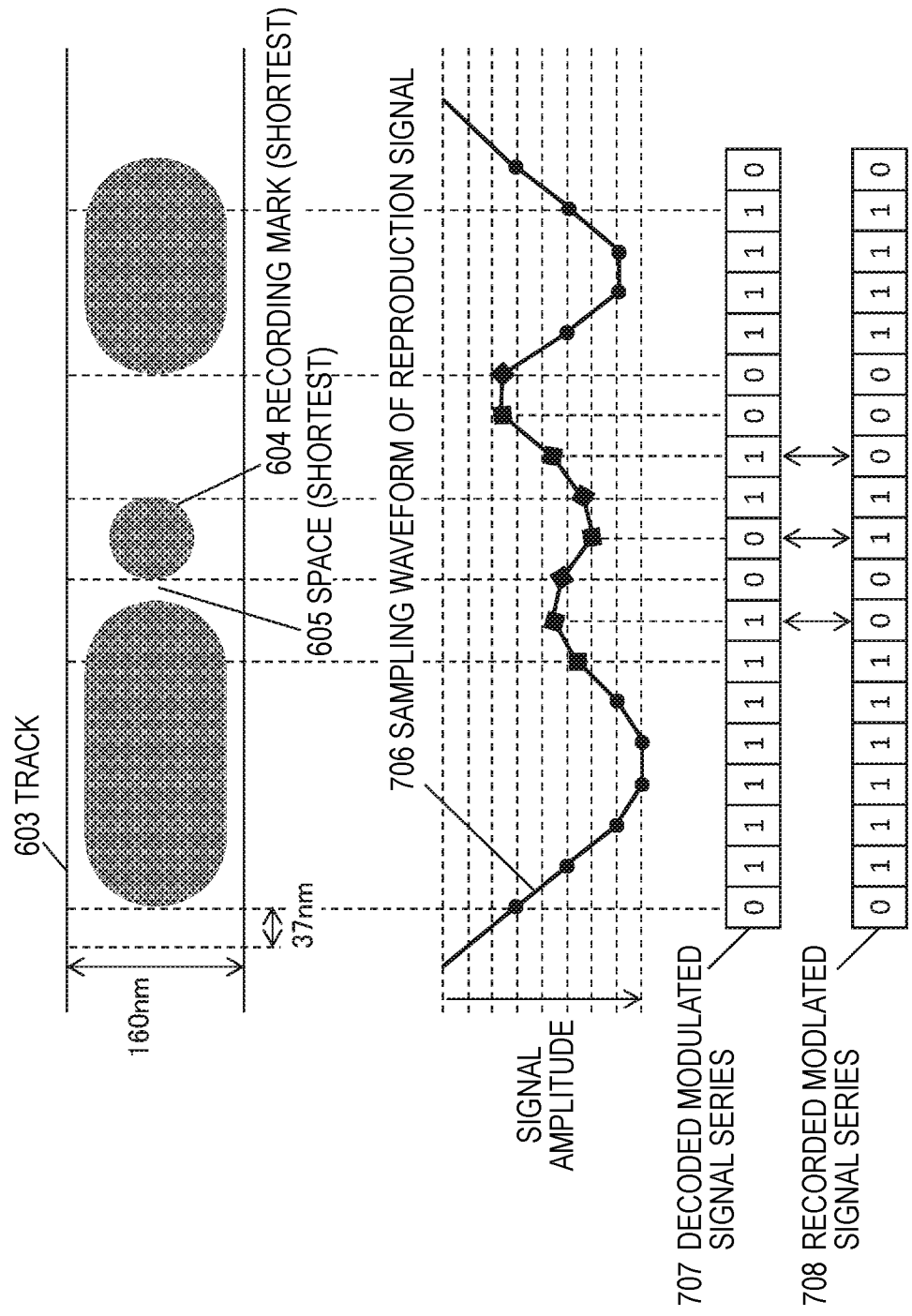
FIG. 7 is a diagram showing a reproduction signal obtained by detecting the state that the marks and the spaces are recorded at the high linear density.

FIG. 7 shows a reproduction signal that is obtained when the recording state shown in FIG. 6 is subjected to reproduction. Unlike in the case of FIG. 5, since large differences in width exist between long marks and short marks, errors occur from the binary state that recording mark portions represent "1" and space portions represent "0." Due to these errors, a sampling waveform 706 of a reproduction signal is distorted from an expected waveform corresponding to the binary state. Although the reproduction signal decoding circuit 108 can accommodate errors by, for example, performing adaptive amplitude correction processing, the probability of occurrence of a decoding error is high in portions having a distortion, as a result of which a decoded modulated signal series 707 includes several errors from a recorded modulated signal series 708.

The power, time widths, time positions, etc. of a laser emission waveform 602 relating to short recording marks and spaces are adjusted to minimize such distortions, the differences in width between long marks and short marks cannot be eliminated.

In view of the above-described problem of the conventional recording method, the recording expected waveform generation circuit 105 and the recording pulse generation circuit 104 are based on a recording method of forming marks having multi-value levels on the optical disk 100 so that a reproduction signal close to a recording expected waveform is obtained by reproduction rather than the binary level recording method of forming marks in intervals in which a modulated signal series has a value "1" and spaces in intervals in which the modulated signal series has a value "0."

Figure 8:
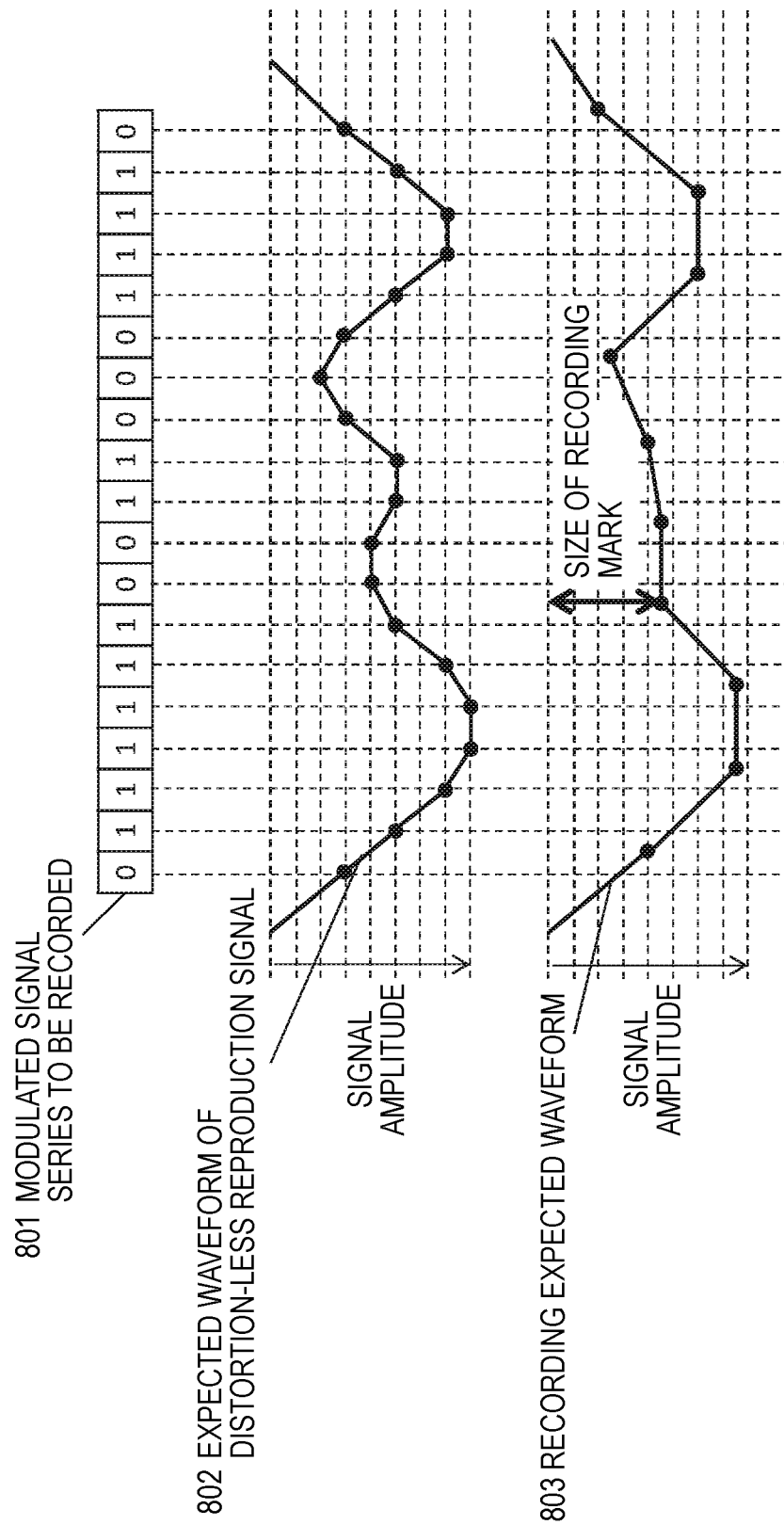
FIG. 8 is a diagram showing a reproduction signal expected waveform and a recording expected waveform.

FIG. 8 shows a recording expected waveform to be generated by the recording expected waveform generation circuit 105. An expected waveform 802 of a distortion-less reproduction signal rather than a distorted reproduction signal as shown in FIG. 7 is generated from a modulated signal series 801 to be recorded. The expected waveform 802 of a distortion-less reproduction signal is an example of the term "first expected waveform." The expected waveform 802 of a distortion-less reproduction signal can be calculated by convolution between an impulse response waveform determined from a frequency characteristic of detection using a light beam and the modulated signal series 801 to be recorded. A recording expected waveform 803 is calculated as a waveform obtained by sampling of 1T intervals, and the maximum frequency of the corresponding frequency range is as low as 0.15 (see FIG. 3). According to the sampling theorem, a waveform can be obtained without deterioration by sampling at a frequency that is higher than or equal to 0.3 that is two times 0.15, that is, at an interval that is shorter than 3.33T. In the embodiment, a 2T interval is employed that can be realized more easily than the 3.33T interval. The recording expected waveform 803 is generated by sampling (resampling) the expected waveform 802 of a distortion-less reproduction signal at 2T intervals. The recording expected waveform 803 is an example of the term "second expected waveform." A waveform that is close to the expected waveform 802 of a distortion-less reproduction signal can be obtained at the time of reproduction by forming, at 2T intervals, recording marks whose sizes correspond to signal amplitude values of the recording expected waveform 803. The sampling interval of the recording expected waveform 803 may be set as appropriate according to the maximum value of a frequency characteristic of a reproduction signal to be reproduced.

Figure 9:
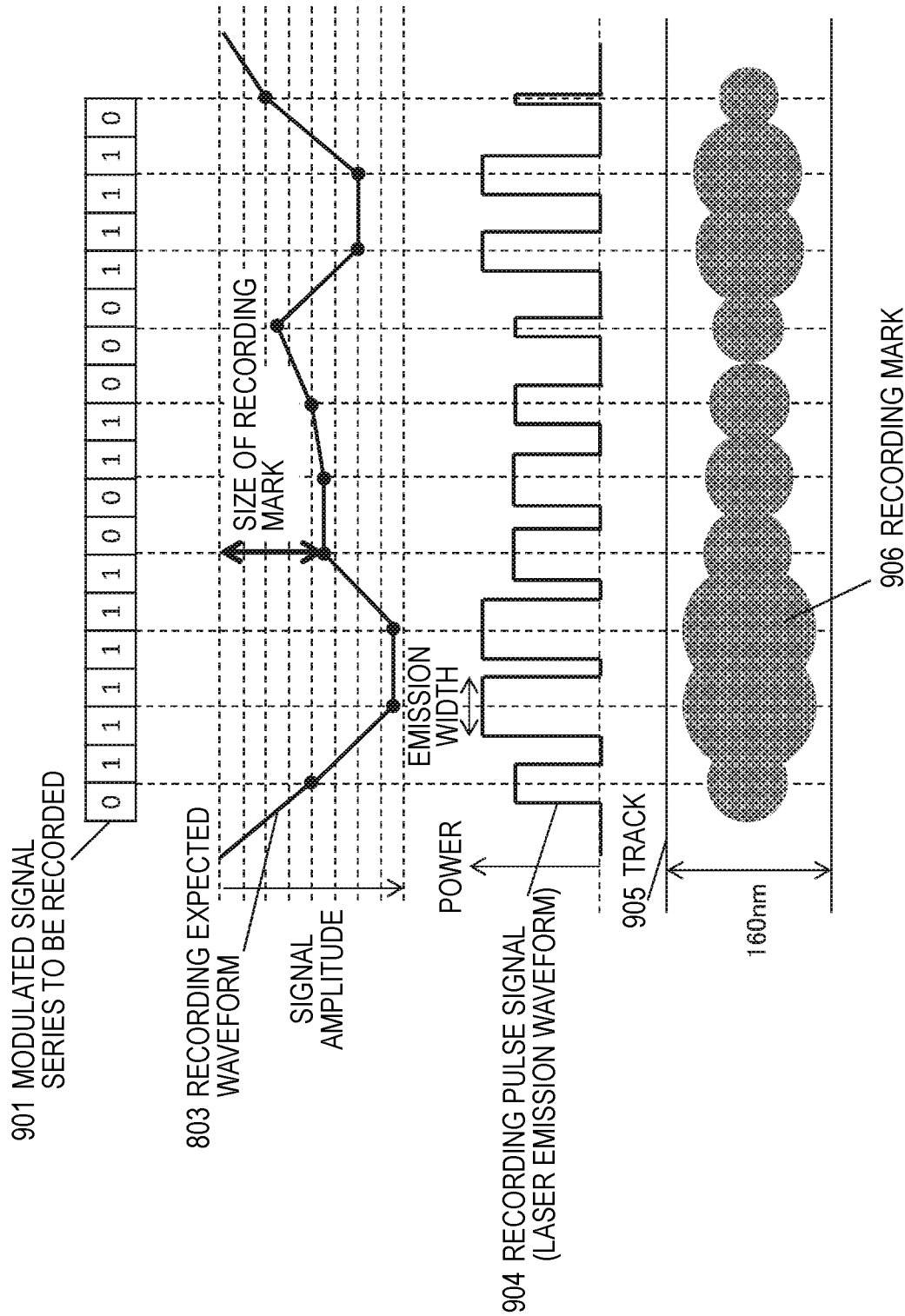
FIG. 9 is a diagram showing recording pulses generated on the basis of the recording expected waveform and a recording state.
Figure 10:
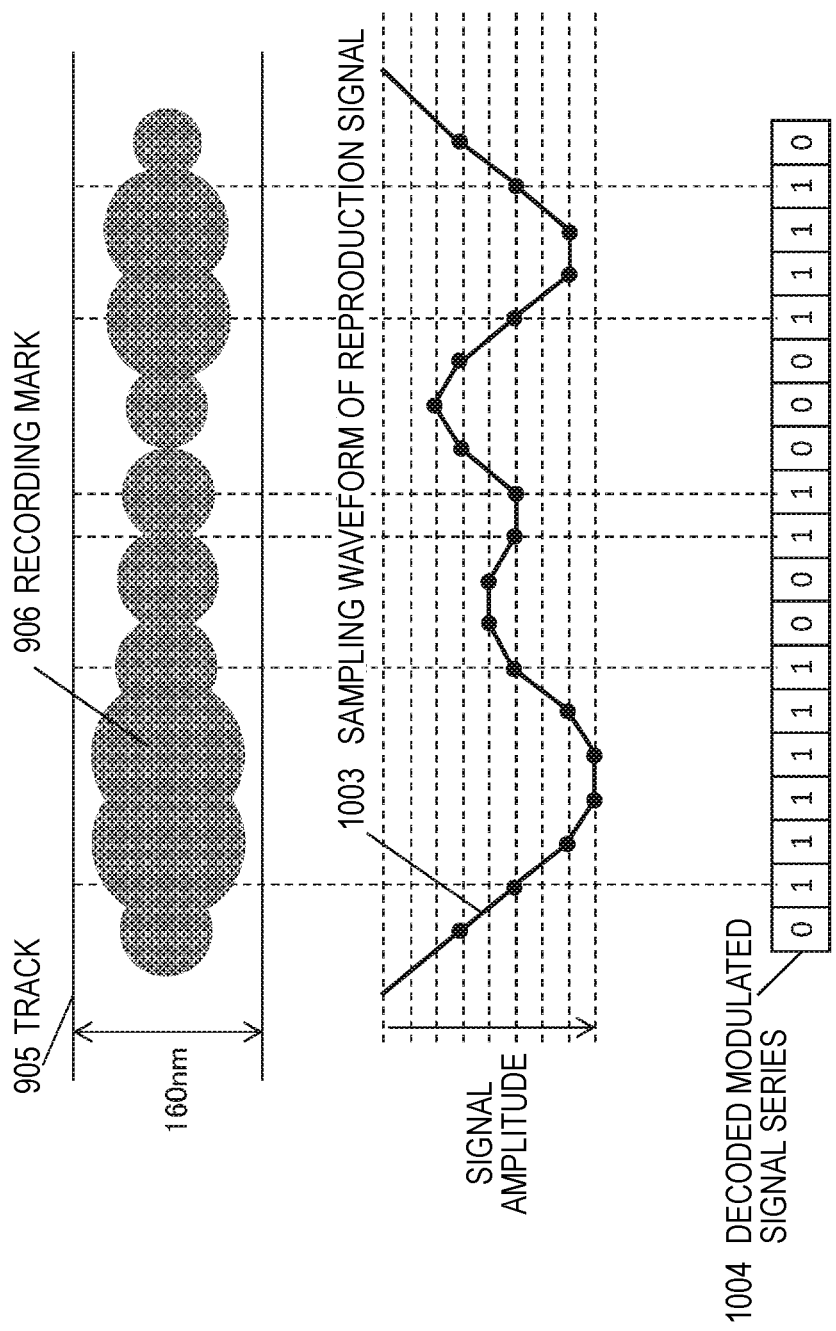
FIG. 10 is a diagram showing a reproduction signal obtained by detecting the recording state recorded on the basis of the recording expected waveform.

FIG. 9 shows how to form recording marks whose sizes correspond to signal amplitude values of the recording expected waveform 803. A laser emission waveform of a recording pulse signal 904 that is based on signal amplitude values of the recording expected waveform 803 rather than the laser emission waveform corresponding to the values of the modulated signal series shown in FIGS. 4 and 5 is produced. The power and the emission width may be increased when the signal amplitude value of the recording expected waveform 803 is large and may be decreased when the signal amplitude value of the recording expected waveform 803 is small. In this manner, as shown in FIG. 9, on the track 905, recording marks 906 having different sizes are formed continuously at 2T intervals at respective sampling points of the recording expected waveform 803. The recording marks 906 formed in this manner have mark shapes capable of producing an expected reproduction waveform corresponding to the modulated signal series when reproduced by illumination with a light beam. Since formation of each recording mark is influenced by propagation of heat generated by laser light emitted immediately before, the power and the emission width of a recording pulse signal may be controlled under a condition obtained by combining with the laser light emitted immediately before. FIG. 10 shows a reproduction signal obtained by reproducing the recording state shown in FIG. 9. A sampling waveform 1003 of a reproduction signal that is close to the expected waveform 802 of a distortion-less reproduction signal generated at the time of recording is obtained from the recording marks that are formed continuously. By virtue of the recording of multi-value levels rather than recording of binary levels (marks and spaces), a sampling waveform 1003 of a good reproduction signal is obtained that is free of distortions of a reproduction signal as shown in FIG. 7. Furthermore, a good decoded modulated signal series 1004 can be obtained from the sampling waveform 1003 of the reproduction signal.

The optical head 101 drives the laser on the basis of the recording pulse signal 904. Marks corresponding to the recording pulse signal 904 are formed continuously by applying laser pulses to tracks of the optical disk 100.

The system controller 114 controls the above-described recording operation. The system controller 114 determines recording positions on the optical disk 100, and moves the optical head 101 to a target position by controlling the servo controller 103. Operation of the error correction coding circuit 107 is started before the target position (track) is reached. Operation of the modulation circuit 106, the recording expected waveform generation circuit 105, and the recording pulse generation circuit 104 is started as soon as the target position is reached and recording is thereby started.

Next, a reproduction operation of the optical disk device 10 according to the embodiment will be described.

As shown in FIG. 10, the reproduction signal decoding circuit 108 generates a decoding signal by decoding a reproduction signal that is output from the optical head 101 by PRML signal processing. The demodulation circuit 109 demodulates the decoding signal according to the RLL modulation codes of d=1 limitation, and the error correction decoding circuit 110 restores the user data by correcting errors in demodulated coded data.

The system controller 114 controls the above reproduction operation. The system controller 114 moves the optical head 101 to a target position by controlling the servo controller 103. Operation of the reproduction signal decoding circuit 108 and the demodulation circuit 109 is started as soon as the target position is reached. Operation of the error correction decoding circuit 110 is then started, whereby the user data are restored. The restored user data are stored in the buffer memory 113 and transmitted to the host 116 via the I/F circuit 112, whereby the reproduction operation is completed.

The recording condition evaluation circuit 111 measures deviations of recording conditions by comparing the sampling waveform 1003 of the reproduction signal shown in FIG. 10 obtained by the reproduction with the expected waveform 802 of a distortion-less reproduction signal shown in FIG. 8. Based on this measurement result, the system controller 114 adjusts the power and emission width conditions of the recording pulse signal 904 for the signal amplitude value of the recording expected waveform 803 shown in FIG. 9. That is, the power and time width relationship for the amplitude value of the recording expected waveform 803 is corrected by the recording condition evaluation circuit 111. As a result, deviations of the recording state due to an emission power variation etc. of the optical head 101 can be corrected.

Advantages Etc

As described above, according to the first embodiment, in the optical disk 100 and the optical disk device 10, instead of binary recording that is adapted to the 1T length that becomes shorter as the density increases, a waveform that is expected to be obtained by reproduction is used as a recording expected waveform to become a base of the recording conditions, whereby a recording state can be realized in which the distortion is small even if the density is increased.

Among recording methods for an optical disk is, for example, a multi-value recording method in which cells are provided virtually at constant intervals in a track extension direction (line direction) and a recording mark having one of three or more different sizes is recorded in each cell. Also in the mark and space recording methods shown in FIGS. 4 and 6, recording is performed at constant intervals bit by bit of a modulated signal series. Where, for example, the size of a recording mark is changed cell by cell in multi-value recording, a recording mark sticks out of a cell if high linear density recording is performed in which the length of cells is made shorter. As mentioned above, in decoding processing an expected waveform is calculated by convolution between a prescribed impulse response waveform and a modulated signal series and the modulated signal series is irrelevant to the sticking-out of recording marks from cells. Because of the extension from recording of a binary signal to recording of a multi-value signal, the number of errors due to the sticking-out of recording marks from cells is increased in addition to the fact that the population parameter of states that require a judgment in decoding processing is increased. As a result, errors between a reproduction waveform and an expected waveform in decoding processing become non-negligible, possibly resulting in reduction in reproduction performance. In contract, in the embodiment, though it is directed to the multi-value recording method, a reproduction signal as expected in decoding processing that is not influenced by sticking-out of recording marks from cells even in high linear density recording can be obtained by employing a recording method in which a reproduction waveform is reproduced using a recording expected waveform, whereby desired reproduction performance can be realized.

Embodiment 2

Figure 11:
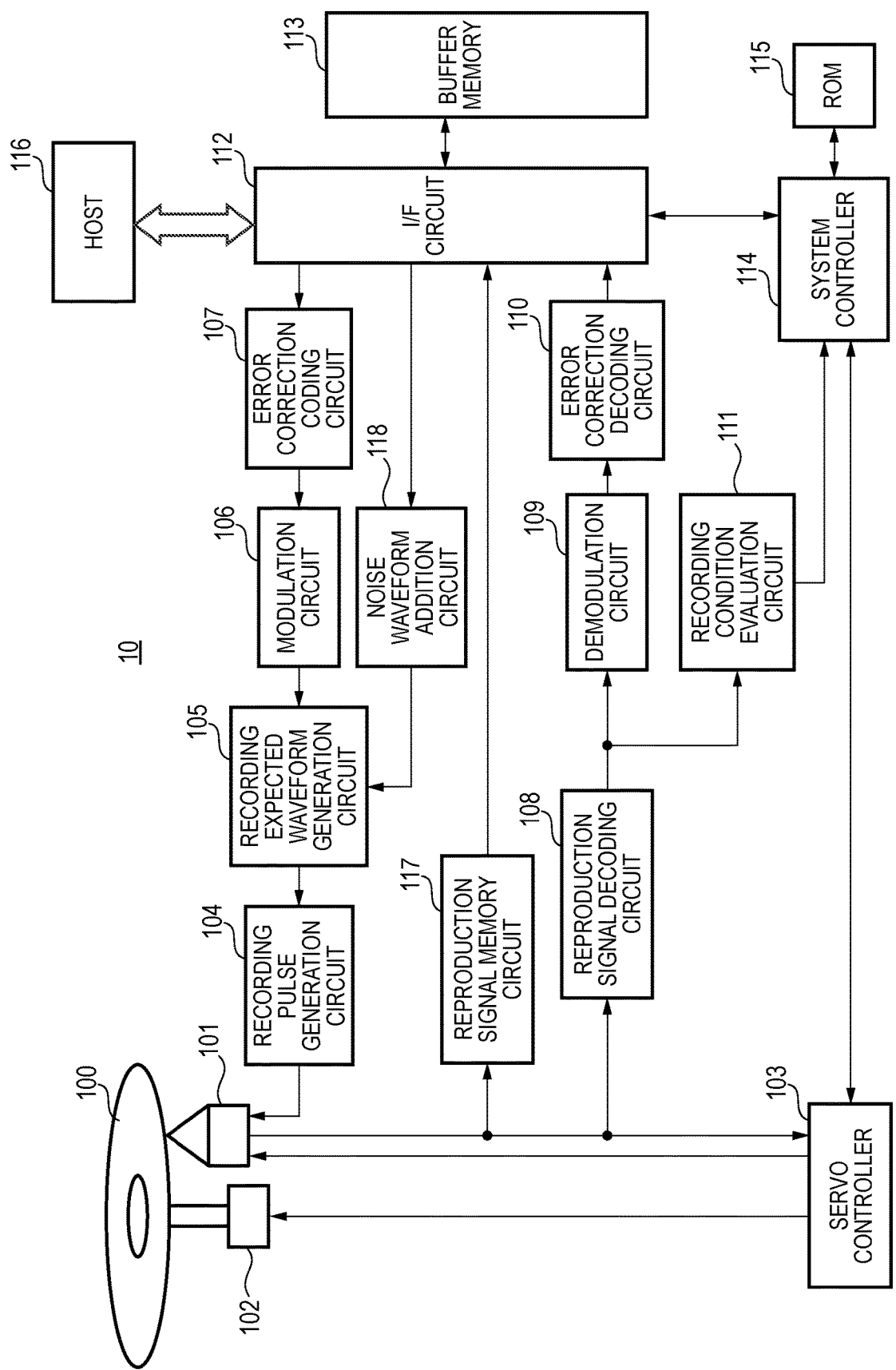
FIG. 11 is a block diagram showing the configuration of an optical disk device according to a second embodiment.

FIG. 11 is a diagram showing the configuration of an optical disk device 10 according to a second embodiment. As shown in FIG. 11, as in the configuration shown in FIG. 1 that was described in the first embodiment, the optical disk device 10 includes the optical head 101, the spindle motor 102, the servo controller 103, the recording pulse generation circuit 104, the recording expected waveform generation circuit 105, the modulation circuit 106, the error correction coding circuit 107, the reproduction signal decoding circuit 108, the demodulation circuit 109, the error correction decoding circuit 110, the recording condition evaluation circuit 111, the I/F circuit 112, the buffer memory 113, the system controller 114, and the ROM (read-only memory) 115. The optical disk device 10 according to the second embodiment is characterized in being further equipped with a reproduction signal memory circuit 117 and a noise waveform addition circuit 118 and an operation that is performed by a combination of these two circuits and the recording expected waveform generation circuit 105.

The basic configurations and operations of the optical head 101, the spindle motor 102, the servo controller 103, the recording pulse generation circuit 104, the recording expected waveform generation circuit 105, the modulation circuit 106, the error correction coding circuit 107, the reproduction signal decoding circuit 108, the demodulation circuit 109, the error correction decoding circuit 110, the recording condition evaluation circuit 111, the I/F circuit 112, the buffer memory 113, the system controller 114, and the ROM (read-only memory) 115 are the same as described in the first embodiment and hence will not be described.

The reproduction signal memory circuit 117 samples a reproduction signal obtained from the optical head 101 and stores digital waveform data produced by the sampling in the buffer memory 113 via the I/F circuit 112. When unrecorded tracks on which no user data are recorded are subjected to reproduction, a disk noise reproduction signal is obtained that includes a disk noise component generated due to the track shape of the optical disk 100, a reflectance variation, etc.

The noise waveform addition circuit 118 reads out, via the I/F circuit 112, the digital waveform data of the disk noise reproduction signal stored in the buffer memory 113, and outputs the read-out digital waveform data to the recording expected waveform generation circuit 105. Since the disk noise reproduction signal also includes a laser noise, a circuit noise, etc. generated at the time of reproduction, it is subjected to lowpass filter processing to reduce influences of these and a resulting signal is output to the recording expected waveform generation circuit 105.

The recording expected waveform generation circuit 105 generates an expected waveform 802 of a distortion-less reproduction signal (see FIG. 8) from a modulated signal series to be recorded and subtract, from the expected waveform 802, the digital waveform data of the disk noise reproduction signal obtained by the noise waveform addition circuit 118. After the subtraction processing, the recording expected waveform generation circuit 105 generates a recording expected waveform 803 by performing sampling again at 2T intervals. As a result, a modulated signal series is recorded in which the disk noise component specific to the optical disk itself is canceled.

The system controller 114 controls the individual circuits and controls a communication with the host 116 by reading out and running the programs stored in the ROM 115. The system controller 114 acquires digital waveform data of a disk noise reproduction signal from tracks on which to record user data by causing the reproduction signal memory circuit 117 to operate before recording of the user data. Then the system controller 114 controls the individual circuits to record the user data while reading out the digital waveform data of the disk noise reproduction signal with such timing that the user data are recorded at corresponding positions by causing the noise waveform addition circuit 118 to operate.

As described above, according to the second embodiment, in the optical disk 100 and the optical disk device 10, a modulated signal series can be recorded in a state that a disk noise component is canceled. Although the influence of a disk noise component on reproduction increases in a relative sense when the 1T length becomes shorter as the density increases, the second embodiment makes it possible to secure stable reproduction performance by reducing the influence of the disk noise component.

The present application is based on Japanese Patent Application No. 2018-214767 filed on Nov. 15, 2018, the disclosure of which is invoked in this application by reference.

INDUSTRIAL APPLICABILITY

The present disclosure can be applied to optical disks and optical disk devices for recording and reproduction of data.

DESCRIPTION OF SYMBOLS

10: Optical disk device
100: Optical disk
101: Optical head
102: Spindle motor
103: Servo controller
104: Recording pulse generation circuit
105: Recording expected waveform generation circuit
106: Modulation circuit
107: Error correction coding circuit
108: Reproduction signal decoding circuit
109: Demodulation circuit
110: Error correction decoding circuit
111: Recording condition evaluation circuit
112: I/F circuit
113: Buffer memory
114: System controller
115: ROM
116: Host
117: Reproduction signal memory circuit
118: Noise waveform addition circuit
401, 601, 801: Modulated signal series to be recorded
402, 602: Laser emission waveform
403, 603, 905: Track
404, 604, 906: Recording mark
405, 605: Space
506, 706, 1003: Sampling waveform of reproduction signal
507, 707, 1004: Decoded modulated signal series
708: Recorded modulated signal series
802: Expected waveform
803: Recording expected waveform
904: Recording pulse signal

The invention claimed is:

1. An optical disk device for recording and reproducing recording data on and from a track of an optical disk, comprising:
   an optical pickup having a laser of a wavelength $\lambda$ and an objective lens having a numerical aperture N;
   a modulation circuit configured to generate, from the recording data, a modulated signal that is coded under a prescribed coding method;
   a recording expected waveform generation circuit configured to generate a recording expected waveform that is expected to be obtained in decoding the recording data from the track on which the modulated signal is recorded under a condition that a channel base length of the modulated signal is equal to L; and
   a recording pulse generation circuit configured to generate a recording pulse for driving the laser with power and a time width corresponding to an amplitude value of the recording expected waveform for each sampling point of the recording expected waveform,
   wherein the optical pickup records the recording data by applying laser pulses to the track based on the recording pulse.

2. The optical disk device according to claim 1, wherein the recording expected waveform generation circuit is configured to generate a first expected waveform that is sampled at the channel base length L and expected to be obtained when the recording data are decoded from the track on which the modulated signal is recorded; and
   wherein the recording expected waveform generation circuit is configured to generate a second expected waveform by resampling the first expected waveform at an interval within such a range as to be longer than or equal to the channel base length L and shorter than or equal to ½ of a diffraction limit length $(=\lambda/4N)$ and output the second expected waveform as the recording expected waveform.

3. The optical disk device according to claim 2, wherein the optical pick up further detects a reproduction signal from the track; and
   wherein the optical disk device further comprises:
   a reproduction signal decoding circuit configured to maximum-likelihood-decode, from the reproduction signal, the modulated signal recorded on the track using a condition of a frequency characteristic corresponding to the recording expected waveform; and
   a demodulation circuit configured to demodulate the recorded data under the prescribed coding method from the modulated signal decoded by the reproduction signal decoding circuit.

4. The optical disk device according to claim 3, wherein the reproduction signal decoding circuit is configured to decode the reproduction signal using the first expected waveform as an expected waveform of the maximum likelihood decoding.

5. The optical disk device according to claim 3, further comprising:
- a recording condition evaluation circuit configured to correct a relationship between the power and the time width for the amplitude value of the recording expected waveform in the recording pulse generation circuit based on an error between the recording expected waveform and the reproduction signal.

6. The optical disk device according to claim 3, further comprising:
- a reproduction signal memory circuit configured to store, as digital waveform data, the reproduction signal detected by the optical pickup from the track on which the recording data is recorded, before the recording of the recording data; and
- a noise waveform addition circuit configured to read out the digital waveform data corresponding to a recording position of the recording data,
- wherein the recording expected waveform generation circuit is configured to generate, as the recording expected waveform, a waveform obtained by subtracting the digital waveform data from a waveform that is expected to be obtained when the recording data is decoded from the track on which the modulated signal is recorded.

* * * * *